July 16, 1968  M. W. MORRIS  3,392,867
WATER METER COVER
Filed Jan. 7, 1966  2 Sheets-Sheet 1
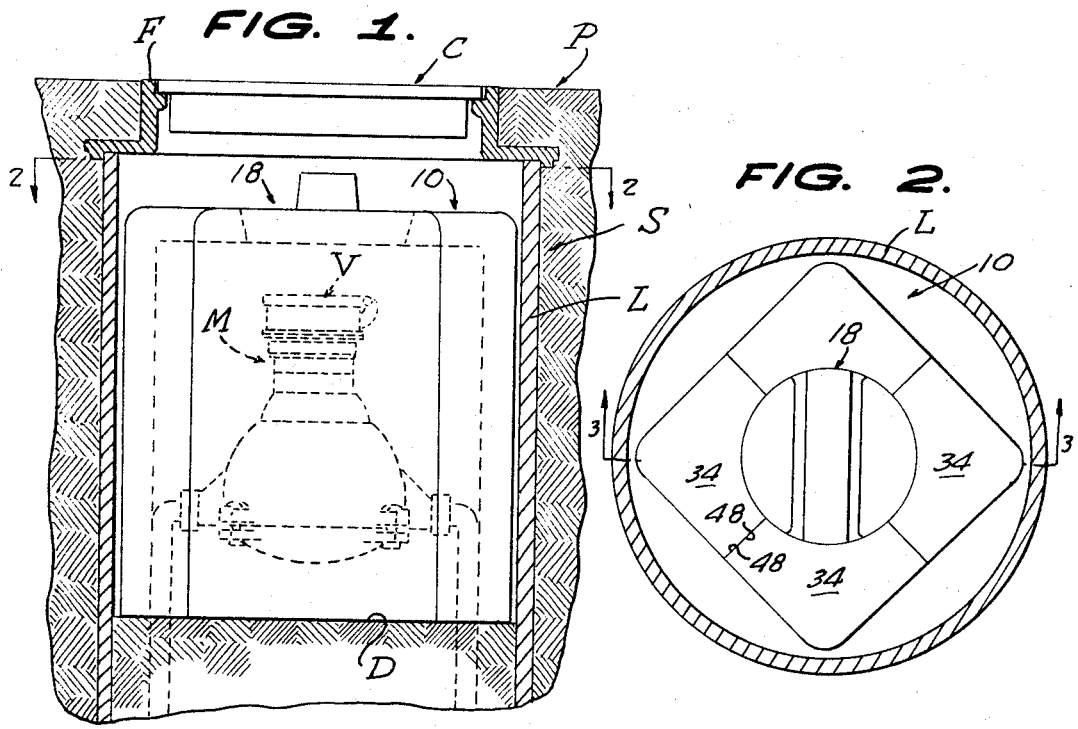
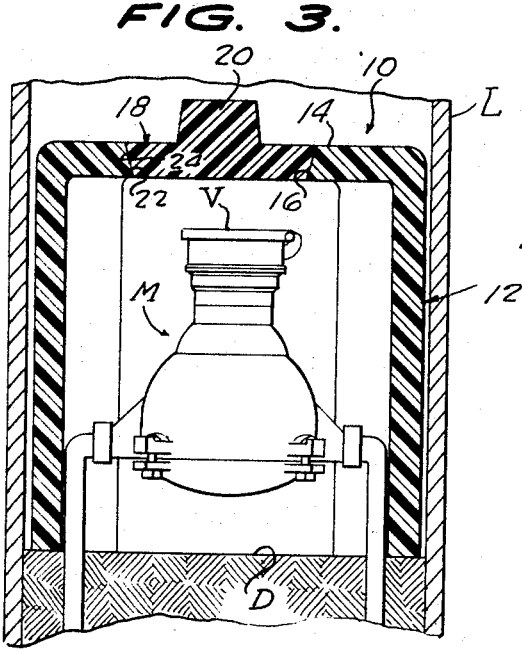
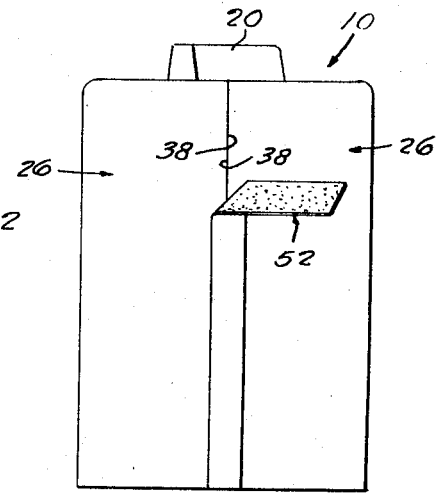
INVENTOR.
MARVIN W. MORRIS,
BY
Berman, Davidson & Berman
ATTORNEYS.

July 16, 1968  M. W. MORRIS  3,392,867
WATER METER COVER

Filed Jan. 7, 1966  2 Sheets-Sheet 2

INVENTOR.
MARVIN W. MORRIS,
BY
Berman, Davidson & Berman
ATTORNEYS.

United States Patent Office 3,392,867
Patented July 16, 1968

3,392,867
WATER METER COVER
Marvin W. Morris, 513 W. 6th St.,
Solomon, Kans. 67480
Filed Jan. 7, 1966, Ser. No. 519,283
4 Claims. (Cl. 220—18)

ABSTRACT OF THE DISCLOSURE

For use with a meter installed in an underground silo, said silo having a constricted entrance; a meter cover formed of heat insulating material and being of greater lateral dimensions than said silo entrance, said cover being divided from top to bottom into independent, interfitting sections each of lateral dimensions sized to pass through said silo entrance for assembly to surround said meter and means to secure said sections in interfitted, assembled relationship.

---

This invention relates to insulating covers for temperature, humidity, and weather affected outdoor instruments, and more particularly to a cover of this kind designed specifically for the protective enclosure of underground water meters.

Outdoor, and particularly municipal, water meters are usually located below ground level, in "silos," to which access for reading and servicing are provided by ground level man-hole covers, the man-hole covers and the "silos" being restricted, by reason of economy and practicality, to minimum dimensions, so that access to the meters is limited substantially to visual inspection thereof, once the meters have been installed.

Further, in localities characterized by extremes of temperature and weather changes, such meter installations are subject to alternating extremes of humidity and dryness, which affects the reliability and accuracy of the meters, and to the danger of freezing which is likely to render the meters inoperative.

For the purpose of reducing or eliminating the above-outline hazards to the operation of water meters, it is a common practice to enclose the meters in insulative, protective covers, the installation of which, because of the extremely limited free space around the meters in their "silos," the problems both of the provision of adequately functioning covers and of installing them, without the expense and trouble or mutilation of the "silos," have been burdensome and have not been satisfactorily solved.

The primary object of the present invention is the provision of a compact, efficient, and easily installed meter cover, of the kind indicated above, which goes beyond previous attempts at ease of installation and adequate protection and insulation of meters.

Another object of the invention is the provision of a meter cover of the character indicated above, which, in one form, is composed of a plurality of similar sections, adapted to sealingly engage each other around a meter, and having readily applicable sealing means serving both to secure the sections together and to seal their meetings, which means can be applied after placement of the cover; and, in another form, "silo" space permitting, the sections are adapted to be cemented together into a unit adapted to be lowered, as a unit, into place around the meter, both forms having readily removable handle-equipped lids for visual inspection openings provided in the tops of the covers.

In the drawings:

FIGURE 1 is a schematic sectional view, showing a cover of the present invention installed around a water meter in an underground, outdoor "silo";

FIGURE 2 is a horizontal section, taken on the line 2—2 of FIGURE 1;

FIGURE 3 is a vertical transverse section, taken on the line 3—3 of FIGURE 2;

FIGURE 4 is a side elevation, on a reduced scale, of the cover, per se, showing an assembling and sealing tape in process of application thereto;

Figure 5:
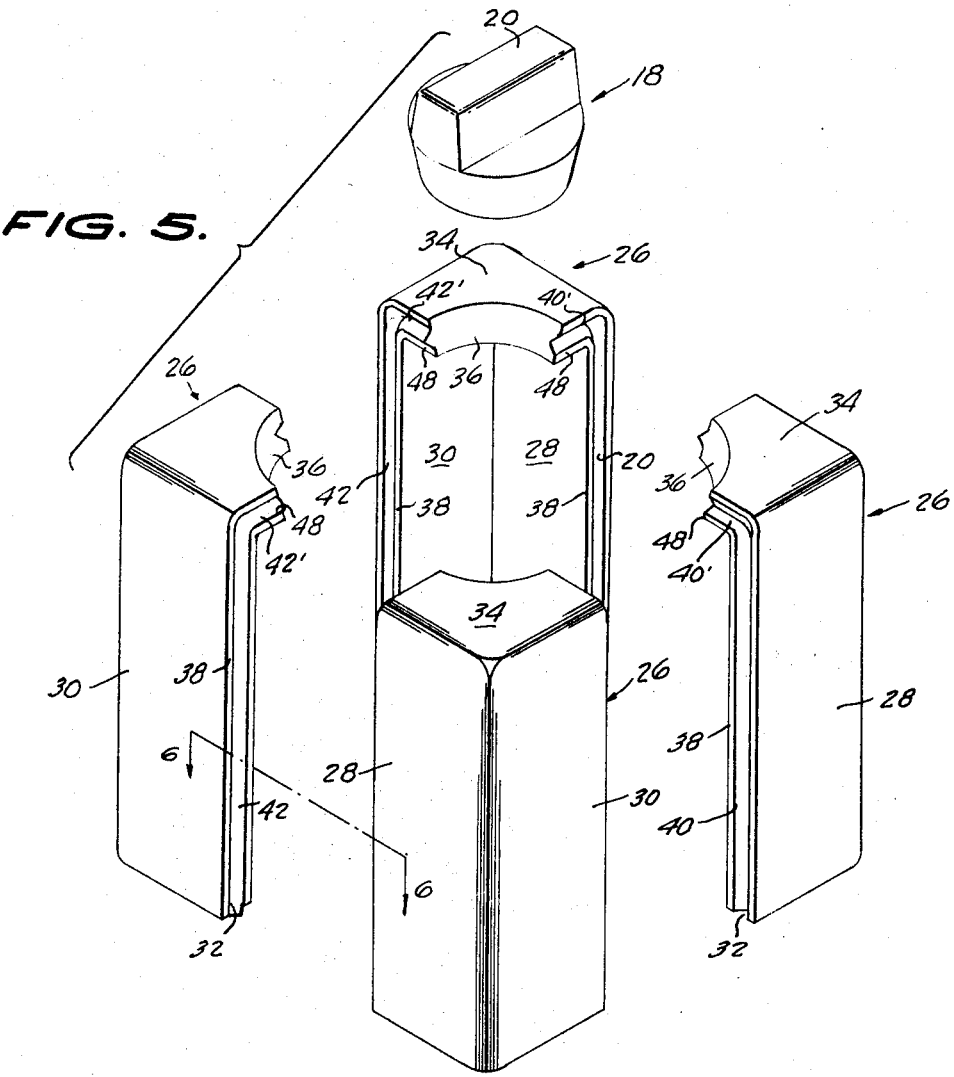
FIGURE 5 is an enlarged exploded perspective view of the cover.
Figure 6:
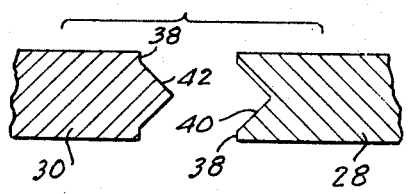
FIGURE 6 is a further enlarged fragmentary horizontal section, taken on the line 6—6 of FIGURE 5; and, FIGURE 7 is a view, like FIGURE 6, showing related cover sections joined.

Referring in detail to the drawings, an outdoor water meter "silo" S is shown, which extends below the level of a pavement P, which is formed with a circular opening occupied by an annular fitting F, in which is supported a man-hole cover C. The aperture of the fitting F is usually somewhat smaller in diameter than the "silo," or of a lining L thereof; and the lining L is not substantially larger in diameter than the water meter M installed in the "silo," usually upon or a slight distance above the upper surface of a dirt fill D. Such an arrangement can afford adequate visual inspection of the meter's dial V, on the upper end thereof, simply by removal of the manhole cover C. Mowever, the installation, in the "silo" S, around the meter M, of an adequate protective and insulative cover, due to restricted spaces, presents obvious difficulties.

An adequate cover 10, of the present invention, comprises a vertically elongated housing 12, herein shown as being of rectangular cross section, formed of suitable impervious and cold insulating material, of horizontal dimensions to closely surround the meter M, and its appurtenances, and fit closely but spacedly within the "silo" lining L; and of sufficient height to rest upon the dirt fill D and rise above the meter M, and still be spaced below the level of the pavement P, and its man-hole cover C.

The housing 12 is formed on its top wall 14, with a centered opening 16, which is normally closed by a self-sealing lid 18, provided with an upstanding handle 20. As shown in FIGURE 3, the opening 16 has a downwardly and inwardly bevelled edge 22, which provides a seat for the bevelled edge 24, of the lid 18. The opening 16 is large enough in diameter, both for free visual inspection of the meter's dial V, and of the meter itself, for normal servicing of the meter M. The cover 10 can, within the purview of the invention, be cylindrical in cross section, or be of polygonal cross section other than the square cross section illustrated herein.

The housing 12 is composed of a plurality, here shown as four, of similar mating, vertically divided sections 26. Each section 26 is composed of a pair of similar right angularly related side walls 28 and 30, respectively, having coplanar flat lower edges 32, these sections having in common a flat horizontal, segmental top wall portion 34. The top wall portion 34 is formed with a concave arcuate radially inwardly disposed edge 36, the edges 36 serving, in the assembled condition of the sections 26, to define the cover top wall opening 16 and its bevelled edge 22, adapted to accommodate the lid 18.

Figure 7:

The free side edges 38 of the section side walls 28 and 30 are severally formed with centered, vertical V-shaped grooves 40 and V-shaped beads 42, respectively. As shown in FIGURE 7, the grooves 40 and the beads 42 occupy the major part of the widths of the section side wall edges 38, and are proportioned and shaped to interfit with each other. In this arrangement, the areas of the side wall edges 38 remaining, at the opposite sides of the grooves and beads, are arranged to come into abutting engagement with each other, and this, together with the interfitting of the grooves and beads serves to seal the engagements of the adjacent sections with each other.

As shown in FIGURE 5, the grooves 40 and the beads 42 are continued into the side edges 48, of the top wall portions 34, as indicated at 40' and 42'. The side edges 48, of the top wall portions 34, are coplanar with the side edges 38 of the sections 26.

Where the dimensions and construction of a "silo" S and its associated water meter M permit, the cover sections 26 may be preassembled, above ground, and passed into the "silo" into place around the water meter M. In this case, the sections 26 are adapted to be held together, in assembled relationship, either by applying suitable glue or cement to their meeting and interfitting edges; or by applying suitable impervious adhesive tapes 52, as indicated in FIGURE 4, externally across the junctures of the meeting edges of the sections 26. The tapes 52 are preferably applied to the full height of the sections 26 and across the tops thereof, where the side edges of the top wall portions 34 meet.

In the more likely event that the "silo"-meter arrangement does not permit of free passage of the assembled cover 10 into place, the sections 26 thereof, being substantially smaller in cross section than the assembled cover, are adapted to be easily passed into place, around the meter M, and worked into assembled relationship, in place on the dirt fill D, the assembly of the sections then being completed, either by pressing together cement carrying edges thereof, or by applying tapes 32 across and along their meeting edges.

What is claimed is:

1. For use with a meter installed in an underground silo, said silo having a constricted entrance: a meter cover formed of heat insulating material and being of greater lateral dimensions than said silo entrance, said cover being divided from top to bottom into independent, interfitting sections each of lateral dimensions sized to pass through said silo entrance for assembly to surround said meter and means to secure said sections in interfitted, assembled relationship.

2. A meter cover as set forth in claim 1, in which said securing means are removable for disassembly of said cover.

3. A meter cover as set forth in claim 1, in which said sections, when assembled, define a constricted top opening for inspection of said meter, and a lid of heat insulating material for said opening.

4. A meter cover as set forth in claim 3, in which said securing means are removable for disassembly of said cover.

References Cited

UNITED STATES PATENTS

| | | | |
|---|---|---|---|
| 1,702,296 | 2/1929 | Flink | 220—18 XR |
| 2,369,965 | 2/1945 | Harris. | |
| 2,747,345 | 5/1956 | Plastino. | |
| 3,092,277 | 6/1963 | Brim. | |
| 3,108,710 | 10/1963 | Lange | 220—76 XR |
| 3,195,272 | 7/1965 | Mosher | 220—4 XR |
| 3,263,853 | 8/1966 | Smith | 220—18 |

FOREIGN PATENTS

| | | |
|---|---|---|
| 1,166,072 | 11/1958 | France. |

THERON E. CONDON, *Primary Examiner.*

G. E. LOWRANCE, *Assistant Examiner.*